US008196336B2

(12) United States Patent
Nicholson, III

(10) Patent No.: US 8,196,336 B2
(45) Date of Patent: Jun. 12, 2012

(54) FISHING LURE AND ACCESSORY

(76) Inventor: Oscar T. Nicholson, III, Traceys Landing, MD (US)

(*) Notice: Subject to any disclaimer, the term of this patent is extended or adjusted under 35 U.S.C. 154(b) by 69 days.

(21) Appl. No.: 12/541,994

(22) Filed: Aug. 17, 2009

(65) Prior Publication Data
US 2011/0035987 A1    Feb. 17, 2011

(51) Int. Cl.
A01K 85/00    (2006.01)
(52) U.S. Cl. .................. 43/42.24; 43/42.36; 43/42.37
(58) Field of Classification Search .......... 43/42.24, 43/42.25, 42.28, 42.36, 42.37, 42.4, 42.41, 43/42.42, 43.2, 42.47; A01K 85/00
See application file for complete search history.

(56) References Cited

U.S. PATENT DOCUMENTS

| | | | | |
|---|---|---|---|---|
| 3,017,307 A | * | 1/1962 | Halliburton | 156/72 |
| 4,033,063 A | * | 7/1977 | Mize | 43/42.05 |
| 4,329,804 A | * | 5/1982 | Brown | 43/42.09 |
| 4,790,101 A | * | 12/1988 | Craddock | 43/42.37 |
| 4,799,329 A | * | 1/1989 | Paulsen | 43/42.28 |
| 5,207,016 A | * | 5/1993 | Pate | 43/42.28 |
| 5,630,289 A | * | 5/1997 | Dotson | 43/42.09 |
| 5,899,015 A | * | 5/1999 | Link | 43/42.39 |
| 6,598,336 B2 | * | 7/2003 | Link | 43/42.28 |
| 2005/0005498 A1 | * | 1/2005 | Fasnacht | 43/13 |
| 2008/0236022 A1 | * | 10/2008 | Harrell | 43/42.39 |
| 2008/0289244 A1 | * | 11/2008 | Parks | 43/42.3 |
| 2009/0172993 A1 | * | 7/2009 | Willis et al. | 43/42.28 |

FOREIGN PATENT DOCUMENTS
JP    2006223284 A  *  8/2006
JP    2008054539 A  *  3/2008

OTHER PUBLICATIONS

Machine translation of JP 2006223284.*
Machine translation of JP 2008054539.*

* cited by examiner

Primary Examiner — Darren W. Ark
Assistant Examiner — Kathleen Iwasaki
(74) Attorney, Agent, or Firm — Laubscher & Laubscher, P.C.

(57) ABSTRACT

An accessory for fishing lures of the type including strands of material camouflaging a hook is characterized by a disk formed of flexible material having a flat surface on one side and a tapered surface on the other side. The disk is positioned on the hook of the lure adjacent to a tying collar and extends the profile of the strands of material to provide a more realistic appearance of baitfish for the lure. With the flat surface of the disk adjacent to the tying collar of the lure, the profile of the strands is extended farther than when the disk is oriented with the tapered surface adjacent to the tying collar of the lure.

11 Claims, 2 Drawing Sheets

FISHING LURE AND ACCESSORY

BACKGROUND OF THE INVENTION

There are many types of lures used for fishing, depending on the type and size of fish being sought as well as the type of fishing including fly fishing, deep water fishing, trolling and the like. For trolling, fishing lures are designed to be attractive to the fish. They are provided in many styles, colors and shapes to resemble bait desirable to the fish. A common type of lure is a bucktail which includes a teaser which is connected with the fishing line and which may be weighted to cause the lure to sink, a tying collar connected with the teaser, a hook connected with the tying collar, and a plurality of strands of synthetic "hair" connected with the tying collar and surrounding the hook. The strands can be provided in a variety of colors so as to attract the attention of the fish.

When bucktail lures are pulled through the water, either by trolling or jigging, they resemble the movement of baitfish. However, because the strands are wet, they tend to be drawn together during movement in the water which allows the hook to protrude beyond the strands, diminishing the effectiveness of the lure and making it less attractive to larger fish being sought.

The present invention relates to an accessory for lures which helps them retain a baitfish type of appearance and improves the movement of the lure through the water to mimic the appearance of swimming fish.

SUMMARY OF THE INVENTION

Accordingly, it is an object of the invention to provide a fishing lure accessory which is in the form of a generally circular disk having top and bottom surfaces. The top surface is tapered whereas the bottom surface is flat so that the disk has a triangular configuration. A locator such as a protrusion or depression is provided in the central region of the disk to indicate to the user where the hook of a fishing lure is to be inserted through the disk. For larger hooks, the disk may be provided with a through-opening for receiving the hook as the user mounts the disk thereon. The disk is positioned at a desired location and orientation on the hook to affect the movement of the lure when it is pulled through a body of water.

According to another object of the invention, the disk includes a stem extending from one surface thereof to prevent the disk from sliding on the hook when mounted thereon.

According to a further object of the invention, the disk contains an elongated portion representing a fish, worm, or grub extending from one surface.

It is yet another object of the invention to provide a fishing lure including a tying collar, a hook connected with the rear of the tying collar, a plurality of strands of artificial hair extending from the rear of the tying collar and surrounding the hook, and a disk connected with the hook to deflect the strands of artificial hair outwardly from the hook. The disk is generally circular and has top and bottom surfaces, one of which is tapered and the other being flat so that the disk has a triangular configuration. A locator is provided in the central region of the disk to indicate the proper area for receiving the hook of the lure. Depending on the orientation of the disk on the hook, the lure behaves differently when being pulled through the water to attract a fish.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
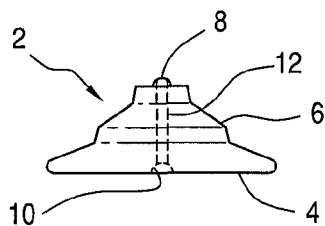
FIGS. 1, 2, and 3 are front, top and bottom views of the fishing lure accessory according to the invention.
Figure 2:
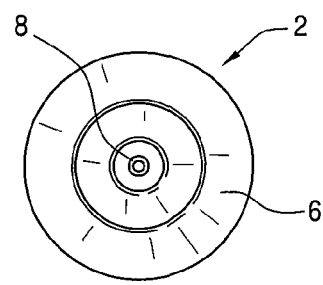
Figure 3:
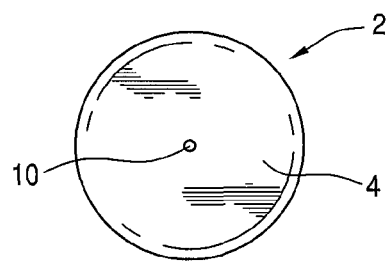

The fishing lure accessory according to a preferred embodiment of the invention will be described initially with reference to FIGS. 1-3. As shown therein, the accessory is in the form of a disk 2 formed of pliable or flexible material such as synthetic plastic and having a generally circular configuration. One surface 4 of the disk is relatively flat and the other surface 6 is tapered, preferably having a stepped configuration as shown in FIG. 1. A locator device such as a protrusion 8 or a depression 10 is provided in a central region of the disk to indicate to the user where a hook is to be passed through the disk as will be developed in greater detail below. While the protrusion 8 is shown on the top of the disk and the depression 10 is shown on the bottom, it is readily apparent that either a protrusion or a depression may be provided in either the top or bottom and will serve the same function. A central through-opening 12 which extends from the top of the disk to the bottom may also be provided. The through-opening is especially beneficial where the disk is for use on larger hooks as it serves to guide the hook through the disk and prevents the disk from tearing during insertion.

Figure 4:
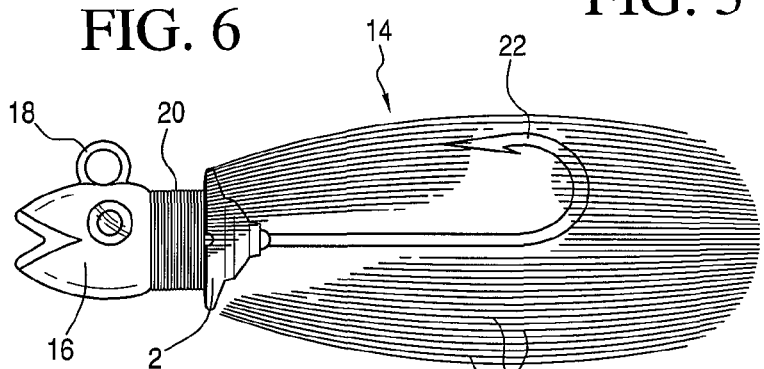
FIG. 4 is a plan view of the disk of FIGS. 1-3 mounted on the hook of a fishing lure with the flat surface facing in the forward direction.

Referring now to FIG. 4, the disk 2 is shown mounted on a lure 14. Specifically, the lure includes a head 16 including an eyelet 18 for tying to a fishing line, not shown. The head is normally configured like the head of a minnow or fish to be attractive to the fish being caught. Extending rearwardly from the head 16 is a tying collar 20 having a hook 22 extending therefrom. For bucktail type lures, a plurality of strands of material 24, such as artificial hair, also extends from the rear of the tying collar to camouflage the hook and to give the lure the appearance of a fish swimming in the water. The disk 2 is mounted on the hook by passing the hook through the disk at the locator in the flat surface of the disk and then sliding the disk to the desired location on the hook, preferably with the flat surface adjacent to the tying collar. In this manner, the disk deflects the strands 24 outwardly so that they cover and hide the hook as well as give the lure a fuller appearance to the fish being caught, making the lure more attractive. In addition, the disk influences the manner in which the lure moves through the water as it is being towed or jerked by the fisherman. That is, the disk causes the lure to sway back and forth through the water to simulate the swimming movement of a minnow or small fish.

It will be readily apparent that disks of different diameters and different tapers may be provided depending on the type and size of the lure and the type of fish being caught.

Figure 5:
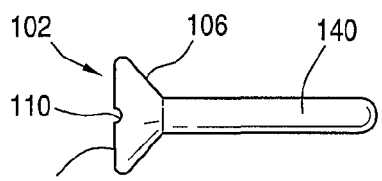
FIGS. 5 and 6 are plan views of alternate configurations, respectively, of a disk having an elongated stem extending from a rear surface thereof.
Figure 6:
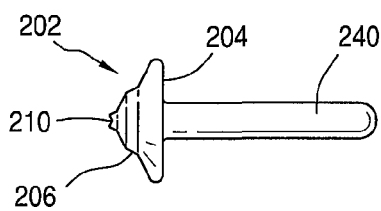

Referring now to FIGS. 5 and 6, an alternate version of the disk 102 according to the invention is show. In FIG. 5, disk includes a flat surface 104 and a tapered surface 106. The front surface contains a depression 110 to serve as a locator for insertion of the hook of a lure. Extending rearwardly from the tapered surface is a generally cylindrical stem 140. Similarly, in FIG. 6 is shown a disk 202 having a tapered front surface 206 having a depression locator 210 and a generally flat surface 206. A stem 240 extends rearwardly from the flat surface.

Figure 7:
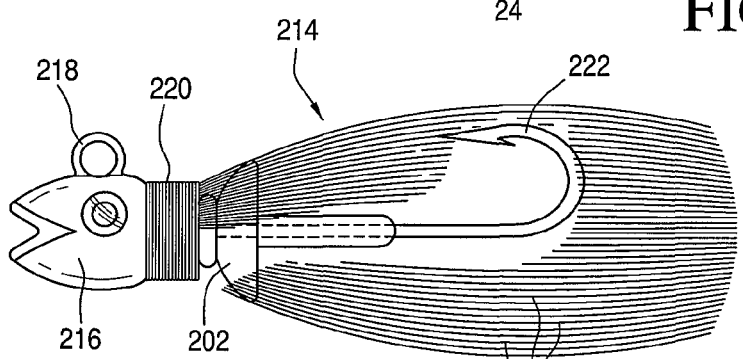
FIG. 7 is a plan view of the disk of FIG. 6 mounted on the hook of a fishing lure with the tapered surface facing in the forward direction.

FIG. 7 is similar to FIG. 4 except that it illustrates the disk 202 of FIG. 6 mounted on the hook 222 of the lure 214 with the tapered surface 206 arranged adjacent to the tying collar 220 at the rear of the head 216 having an eyelet 218. The stem extends along the hook 222 and prevents the disk from sliding rearwardly away from the tying collar. As with the arrangement of FIG. 4, the outer circumference of the disk deflects the strands 224 outwardly to cover the hook and provide a more realistic appearance of a fish. However, the profile of the strands of synthetic hair is greater when the flat surface of the disk is arranged adjacent to the collar as shown in FIG. 4. Moreover, the tapered surface causes the lure to move through the water differently than if the disk is reversed with the flat surface forward. Thus, the arrangement and positioning of the disk on the hook can be altered to produce different effects on the lure depending on the type of fish being caught.

Figure 8:
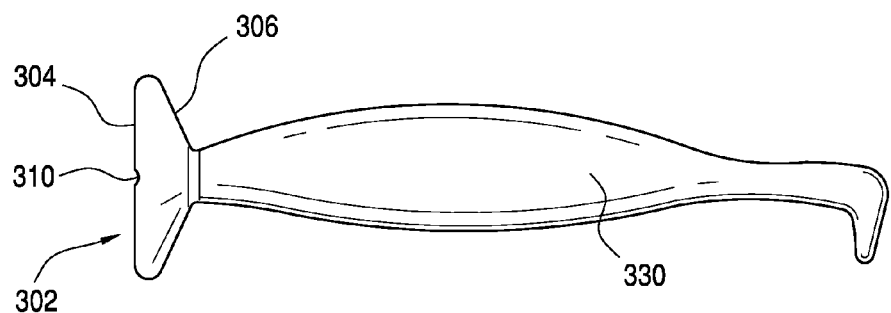
FIG. 8 is a front plan view of an alternate embodiment of the fishing lure accessory having an elongated member extending from the tapered surface of the disk.
Figure 9:
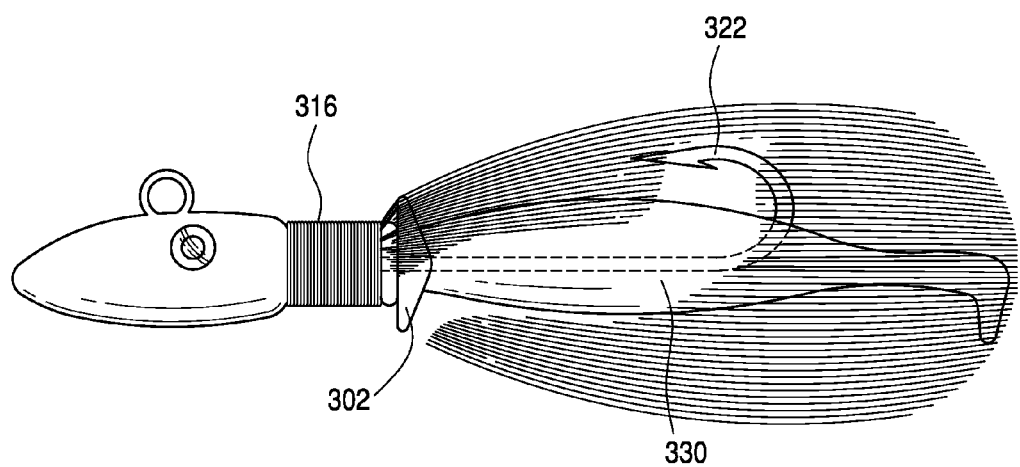
FIG. 9 is a front plan view of a fishing lure with the accessory of FIG. 8 mounted thereon.

Referring now to FIG. 8, a further embodiment of the fishing lure accessory will be described. As shown therein, the accessory includes a disk 302 having a flat surface 304 and a tapered surface 306. Extending rearwardly from the tapered surface is a longitudinal member 330 which is configured to resemble a fish, a worm, a grub, or other conventional bait. In the example shown in FIG. 8, the longitudinal member resembles a shad. A locator in the form of a depression is provided in the center of the flat surface 304 of the accessory for receiving the hook of a lure. As shown in FIG. 9, the accessory is mounted on the hook 322 in a manner similar to the embodiment of FIGS. 4 and 7 in that the hook passes through the disk 302 and the disk is positioned against the rear of the tying collar 316.

Figure 10:
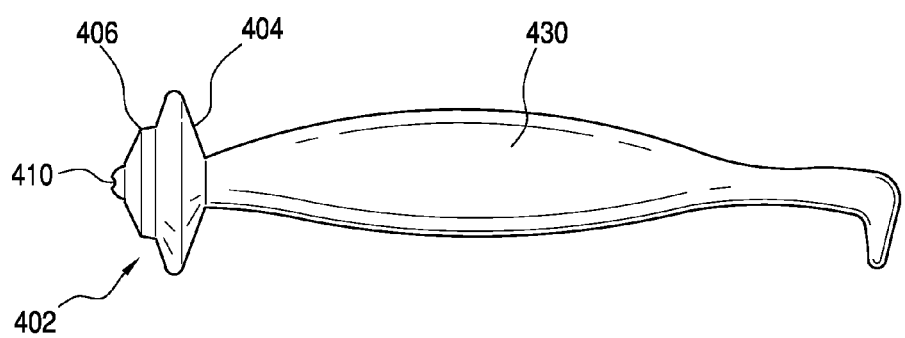
FIG. 10 is a front plan view of a further embodiment of the fishing lure accessory having an elongated member extending from the flat surface of the disk.

FIG. 10 illustrates a further embodiment of the fishing lure accessory according to the invention where a disk 402 has a longitudinal member 430 extending from a flat surface 404 of the disk rather than from a tapered surface 406. A locator in the form of a depression 410 is provided in the center of the tapered surface 406 of the accessory for receiving the hook of a lure. The embodiments of FIGS. 8 and 10 provide different movements of the lure through the water. The size and configuration of the disk and longitudinal member can be altered depending on the type and size of the fish being caught.

The use of the disk on a fishing lure increases the profile of the fish-like appearance of the lure. The stepped surface provides strength to the disk and also provides the user with options for altering the profile of the lure and the movement of the lure through the water. The disk can be used on any type of lure that includes synthetic fibers or natural hair to resemble the configuration of a baitfish. The disks may be made in different sizes and colors to accommodate any style fishing lure that includes skirting material.

While the preferred forms and embodiments of the invention have been illustrated and described, it will be apparent to those of ordinary skill in the art that various changes and modifications may be made without deviating from the inventive concepts set forth above.

What is claimed is:

1. An accessory for a fishing lure having a tying collar, comprising
    a solid annular disk formed of flexible material and having a top surface, a flat bottom surface, and an axis extending through said disk intersecting said top and bottom surfaces, said disk having a tapered configuration wherein said disk terminates at the top surface which is perpendicular to the axis of the disk and represents the smallest diameter of the disk, and the diameter of said disk across said flat bottom surface is greater than the diameter across said top surface, the thickness of said disk as measured along the axis being less than the diameter across said flat bottom surface, said disk being mounted along said axis on a hook behind the tying collar of the fishing lure so that said disk can be positioned at a desired location and orientation on the hook to affect the movement of the lure when it is pulled through a body of water.

2. An accessory as defined in claim 1, wherein said tapered configuration comprises a stepped configuration.

3. An accessory as defined in claim 1, wherein said disk contains a locator in a center portion of at least one of said top and bottom surfaces for receiving said hook.

4. An accessory as defined in claim 3, wherein said locator comprises one of a protrusion and a depression.

5. An accessory as defined in claim 4, wherein said disk contains an axial through-opening extending from said locator between said top and bottom surfaces for receiving the hook of the lure.

6. A fishing lure, comprising
    (a) a tying collar;
    (b) a hook connected with a rear portion of said tying collar;
    (c) a plurality of strands connected with said collar rear portion and surrounding said hook to resemble a fish; and
    (d) a flare adjustably movable on said hook independent of said tying collar and within said plurality of strands, said flare comprising a solid annular disk formed of flexible material separate from said tying collar, said disk having a top surface and a flat bottom surface and an axis extending through said disk intersecting said top and bottom surfaces, the diameter of said disk across said flat bottom surface being greater than the diameter across said top surface to define a tapered configuration, wherein said disk terminates at the top surface which is perpendicular to the axis of the disk and represents the smallest diameter of the disk, and the thickness of said disk as measured along the axis being less than the diameter across said flat bottom surface, said disk receiving said hook along said axis so that said disk may be positioned at a desired location and orientation on the hook to displace said strands around said hook and affect the movement of the lure when it is pulled through a body of water.

7. A fishing lure as defined in claim 6, wherein said disk is mounted on said hook with said flat bottom surface being arranged adjacent to said tying collar.

8. A fishing lure as defined in claim 6, and further comprising a head connected with a forward portion of said tying collar.

9. A fishing lure as defined in claim 6, wherein said disk contains a locator in a center portion of at least one of said top and bottom surfaces for receiving said hook.

10. A fishing lure as defined in claim 9, wherein said locator comprises one of a protrusion and a depression.

11. A fishing lure as defined in claim 10, wherein said disk contains an axial through-opening extending from said locator between said top and bottom surfaces.

* * * * *